US010496455B1

United States Patent
Kulkarni

(10) Patent No.: US 10,496,455 B1
(45) Date of Patent: Dec. 3, 2019

(54) ENABLING SYNCHRONOUS EDITABLE SIGNALS IN PROCESS MODELING

(71) Applicant: SAP SE, Walldorf (DE)

(72) Inventor: Gopalkrishna Kulkarni, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/014,453

(22) Filed: Jun. 21, 2018

(51) Int. Cl.
| G06F 3/00 | (2006.01) |
| G06F 9/44 | (2018.01) |
| G06F 9/46 | (2006.01) |
| G06F 13/00 | (2006.01) |
| G06F 9/54 | (2006.01) |
| G11B 27/031 | (2006.01) |
| H04L 29/08 | (2006.01) |
| G06Q 30/02 | (2012.01) |
| H04L 12/24 | (2006.01) |

(52) U.S. Cl.
CPC ............. *G06F 9/542* (2013.01); *G06F 9/546* (2013.01); *G06Q 30/0252* (2013.01); *G11B 27/031* (2013.01); *H04L 29/08072* (2013.01); *H04L 41/22* (2013.01)

(58) Field of Classification Search
CPC ...................................... G06F 9/542
USPC ....................................... 719/318
See application file for complete search history.

(56) References Cited

U.S. PATENT DOCUMENTS 10,209,985 B2    2/2019    Kulkarni
2018/0341477 A1  11/2018   Kulkarni

FOREIGN PATENT DOCUMENTS

EP    2 423 863    2/2012

OTHER PUBLICATIONS

Camunda.com [online], "BPMN Tutorial: Get Started with Process Modeling using BPMN," [retrieved on May 24, 2018], retrieved from URL <https://camunda.com/bpmn/>, 7 pages.
European Search Report issued in European Application No. 18207741.2 dated Feb. 25, 2019, 12 pages.
Karneges, et al., "XEP-0198: Stream 1-15 Management v1.5," Sep. 13, 2015, retreived from: URL <https://xmpp.org/extensions/attic/xep-0198-1.5.html>, 29 pages.
U.S. Appl. No. 15/962,138, Kulkarni, G., filed Apr. 25, 2018.
U.S. Appl. No. 15/996,824, Kulkarni, G., filed Jun. 4, 2018.

*Primary Examiner* — Timothy A Mudrick
(74) *Attorney, Agent, or Firm* — Fish & Richardson P.C.

(57) ABSTRACT

The present disclosure involves systems, software, and computer implemented methods for enabling synchronous editable signals in process modeling. One example method includes receiving, at a receiver component, a message from a sending component as part of execution of an integration scenario with an external system. The receiver component is an originator that is configured to send event data to at least one registered listener task that has been bound to the receiver. Each registered listener is provided with the event data upon execution and is enabled to enhance the received event data. The receiver component waits to receive a completion notification from each registered listener and generates an acknowledgement to be sent to the sending component, using the event data enhanced by the at least one registered listener. The generated acknowledgment is sent to the sending component.

20 Claims, 8 Drawing Sheets

```
<root>
  <component name="Receiver component" property="originator; originId=123">
  <component name="Task 1" property="listener;originId=123">
  <component name="Task 2" property="listener;originId=123">
  <component name="Task N" property="listener;originId=123">
</root>
```

ENABLING SYNCHRONOUS EDITABLE SIGNALS IN PROCESS MODELING

TECHNICAL FIELD

The present disclosure relates to computer-implemented methods, software, and systems for enabling synchronous editable signals in process modeling.

BACKGROUND

A producer-consumer design pattern can be used in a software system for a producer component to broadcast a message to interested consumer components. Consumer components can subscribe to events of a particular event type, for example. When a producer produces an event of the particular event type, consumers who have subscribed to that event type can receive the event.

SUMMARY

The present disclosure involves systems, software, and computer implemented methods for enabling synchronous editable signals in process modeling. One example method includes receiving, at a receiver component, a message from a sending component of an external system as part of execution of an integration scenario with the external system. The integration scenario is defined by a process model that defines the receiver component and at least one task component, with each task component configured to perform processing for the integration scenario. A determination is made that the receiver component is a registered originator component that is configured to send event data to at least one registered listener component that has been bound to the receiver component. Each registered listener component is a task component defined by the process model. The registered listener components that are bound to the receiving component are determined. Each task component is executed, including the providing of each registered listener component with the event data. Each registered listener component is enabled to enhance the event data received by each respective registered listener component. The receiver component waits to receive a completion notification from each registered listener component. An acknowledgement to be sent to the sending component is generated using the event data enhanced by the at least one registered listener component. The generated acknowledgment is sent to the sending component.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
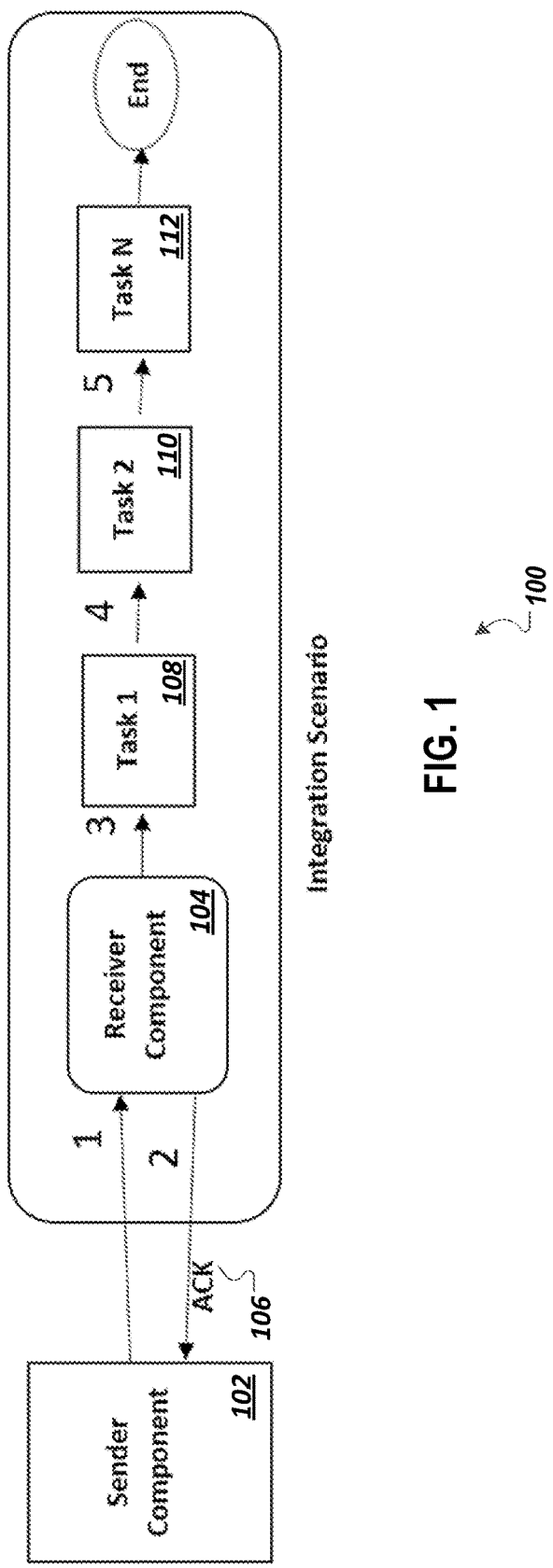
FIG. 1 illustrates a system in which an acknowledgement is sent by a receiver component in response to a message from a sender component.

An integration scenario can model integration and connectivity between two computing systems. Different computing systems can communicate, for example, in business to business (B2B) communication, electronic data interchange (EDI), or some other type of system-to-system or server-to-server communication. The modeling of an integration scenario can include the creation of a process model that describes the integration scenario. In an integration scenario, a sending component in a sending system can send a message to a receiving component in a receiving system. The receiving component may perform some processing on the message and may also initiate one or more downstream tasks to perform other processing in response to receipt of the message.

Some process modeling tools are configured to create a model that describes an integration scenario in which the receiving component sends an acknowledgement to the sending component, which can occur before the downstream tasks have completed. The acknowledgment can be domain-specific and can be in addition to a communication protocol response code (e.g., a HTTP (HyperText Transfer Protocol) response code). For example, in a B2B integration scenario, an AS2 (Applicability Statement 2) integration adapter may send a MDN (Message Disposition Notification) as an acknowledgement to a sending AS2 component.

A modification can be made to a processing modeling tool so that an integration scenario can be modeled where the receiving component is configured to wait until the downstream tasks have completed before sending the acknowledgement to the sending component. Additionally, the receiving component can be modeled such that the receiving component provides an event, event data, or access to a shared resource to the downstream tasks so that one or more of the downstream tasks can enhance the acknowledgement before the acknowledgement is sent to the sending component. An enhanced event, enhanced event data, or an enhanced shared resource can reflect acknowledgement enhancement(s) made by one or more downstream tasks. The receiving component can be configured to use information in the enhanced event, enhanced event data, or enhanced shared resource when sending the acknowledgement to the sending component.

For example, an electronic commerce system may receive an order from an external system. The order may be a bulk message that includes multiple sub-orders, with each sub-order being for a particular quantity of a particular product.

A receiving component in the electronic commerce system may validate the external system and a general format and correctness of the message, but may delegate further processing to downstream task components. In process modeling systems that do not enable the downstream tasks to enhance an acknowledgement, the receiving component may only be able to send an acknowledgement about the validation of the external system and the correctness of the general format of the message. Such process modeling systems may not be able to enable the downstream tasks to enhance an acknowledgement before the acknowledgement is sent.

In a system that enables downstream tasks to enhance an acknowledgement, one or more downstream tasks can enhance the acknowledgement with information about detailed processing that is done by downstream tasks (e.g., processing details unknown to the receiving component). For example, a first task may split the bulk message into sub-messages, with each sub-message corresponding to a particular sub-order. A second task may be invoked multiple times to validate each sub-message. For example, the second task can determine that a quantity value in a particular sub-message is invalid due to not being a positive integer. The second task can be provided with an event, event data, or access to a shared resource and can enhance the event, event data, or the shared resource with information that indicates the invalid quantity of the particular invalid sub-message. Other downstream tasks may perform other validation or other processing, and some or all of the tasks can enhance the event, event data, or shared resource with status information regarding the respective task's processing.

Enabling downstream components to enhance an acknowledgement can enable a receiving component to send an acknowledgement that includes the enhanced information. The receiving component can send the enhanced acknowledgement even though the receiving component does not have full prior knowledge of the acknowledgement that should be constructed. The downstream components of an integration scenario can enhance the acknowledgement to be returned so that the overall acknowledgement returned for the scenario is clarified, as compared to a more simple acknowledgement that may have been returned if the receiving component was the only component contributing to the acknowledgement.

The enhancement of an event, event data, or a shared resource by downstream tasks before a receiving component sends an acknowledgement to a sending component can be referred to as enabling synchronous editable signals. A signal can be synchronous in that the sending component waits for the downstream tasks to complete, before sending the acknowledgement. The signal can be editable in that the downstream tasks can add information to (e.g., enhance) the acknowledgment.

A framework can be added to a process modeling tool to enable the creation of synchronous editable signals. For example, a modeling editor can enable annotation of a component in the receiving system (e.g., the receiving component) as an originating component that provides the synchronous editable signal to other "listener" components (e.g., downstream tasks). Listener components can also be annotated as listener components using the modeling editor. A registry that maps originator to listener components can be maintained.

The framework can provide functionality that automatically links an originator with its listener components at run time. For example, the framework can invoke code that results in an event, event data, or a shared resource being provided to each listener component that is mapped to an originator, when each listener component is invoked. The framework can provide functionality that causes the originator component to wait for each listener component to complete, and to use any enhancement information provided by the listener(s) when sending the acknowledgement to the receiving system.

In addition or alternatively to a receiving component being designated as an originator, a downstream task can be designated as an originator. For example, a first downstream task, which may or may not be a listener for a receiving component, can be designated as an originator for one or more other downstream tasks. For example, second and third downstream tasks can be designated as listeners for the first downstream task. The second and third downstream tasks can be configured to receive event data from the first downstream task, and can enhance the received event data. The first downstream task can be configured to wait until the second and third downstream tasks have notified the first downstream task of their completion, before using the event data that has been enhanced by one or both of the second and third downstream tasks.

In some implementations, a downstream task can be both an originator and a listener. For example, the first downstream task can be a listener for the receiving component. The first downstream task can be configured to receive event data from the receiving component, and to pass the event data to the second and third downstream tasks. The first downstream component can be configured to wait until the second and third downstream tasks have (potentially) enhanced the passed event data, before further enhancing the event data. The further enhancements to the event data can be based on the enhancements performed by the second and third downstream tasks, for example. The first downstream task can send a completion notification to the receiving component, and the receiving component can send an acknowledgement to the sending component, with the acknowledgement including event data that has been enhanced by the second and third downstream tasks, and further enhanced by the first downstream task.

Although a graphical modeling editor is described, annotations can be manually coded by a developer. Asynchronous, as well as synchronous editable signals can be supported. For example, a receiving component can be configured to send a basic acknowledgement to a sending component before downstream task components have been completed. The receiving component can, however, provide each downstream task component with an endpoint known to the sending component, with the endpoint capable of receiving enhanced acknowledgement information from the downstream tasks.

FIG. 1 illustrates a system 100 in which an acknowledgement is sent by a receiver component in response to a message from a sender component. At a first step, a sender (e.g., sending) component 102 sends a message to a receiver (e.g., receiving) component 104 as part of an integration scenario. At a second step, the receiver component 104 sends an acknowledgement 106 to the sender component 102. As part of processing the message received from the sender component 102, the receiver component 104 initiates processing by a set of tasks 108, 110, and 112. At third, fourth, and fifth steps, the tasks 108, 110, and 112 are executed, respectively. If one or more of the tasks 108, 110, or 112 generate information that is desired to be included in the acknowledgment 106, that information is not included in the acknowledgement 106 in this example, since the acknowledgement 106 is sent before the tasks 108, 110, and 112 are executed. As described in more detail below, the receiver component 104 can be configured to wait until the tasks 108, 110, and 112 have finished executing, before sending the acknowledgement 106.

Figure 2:
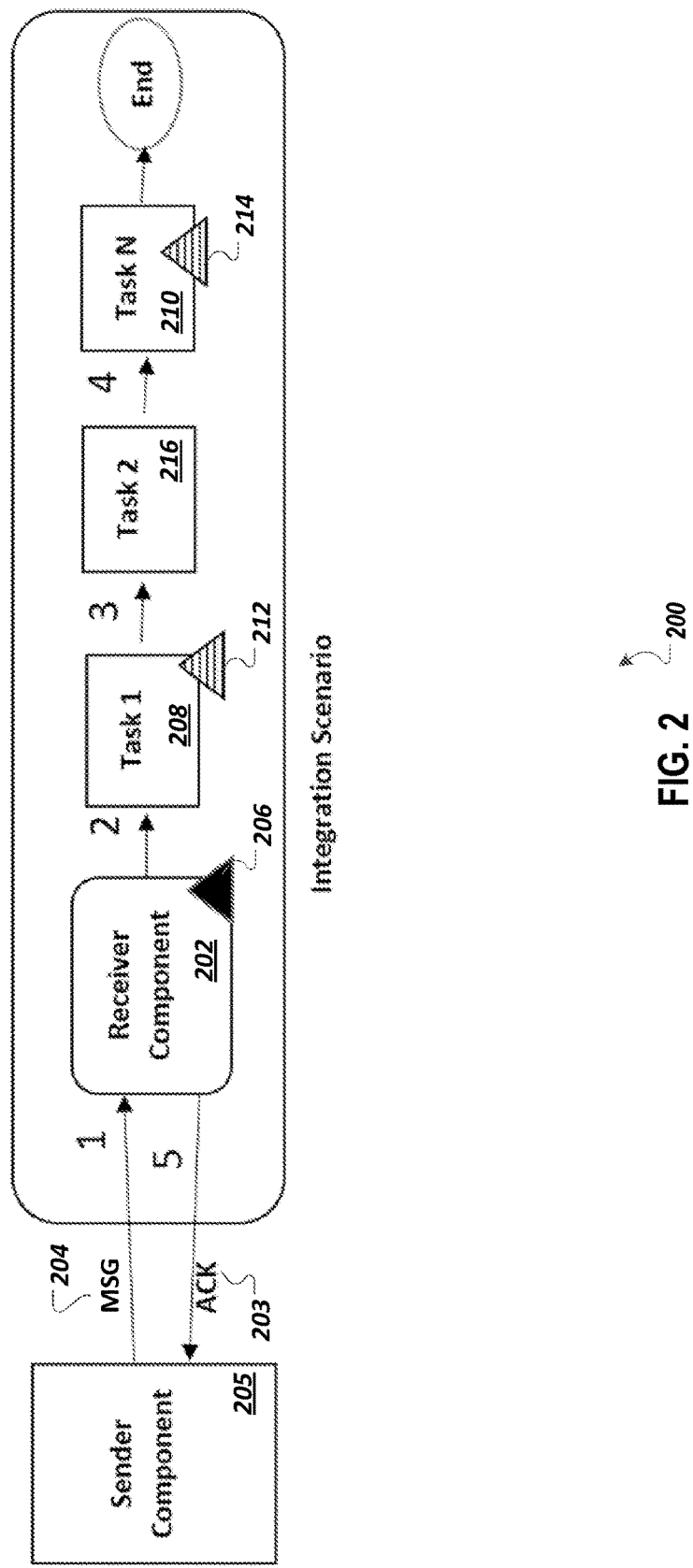
FIG. 2 illustrates a system in which a receiver component waits for listener tasks to complete before sending an acknowledgement to a message sent by a sender component.

FIG. 2 illustrates a system 200 in which a receiver component 202 waits for listener tasks to complete before sending an acknowledgement 203 to a message 204 sent by a sender component 205. The message 204 from the sender component 205 is sent in a first step. The receiver component 202 has been annotated (e.g., with a symbol 206) as an originator component. An originator component is configured to send an event, event data, or a shared resource, to one or more tasks that have been designated as listener tasks. For example, tasks 208 and 210 have been designated (e.g., by having been annotated with symbols 212 and 214, respectively) as listener tasks, while a task 216 has not been designated as a listener task.

Based on being annotated with the symbol 206, the receiver component 202 is configured to wait to send the acknowledgement 203 until receiving a completion notification from both the task 208 and the task 210. The receiving component 202 can establish a skeleton of the acknowledgement 203, where the skeleton can include, for example, validation information about a basic validity of the message 204. The present solution can, in response to an annotation being applied to a particular element, component, or task, automatically perform and implement the connections and configurations required to allow the enhanced acknowledgement to be performed. Such annotations may be made in any suitable program, such as a process model editor, an integrated development environment, or other suitable application or component.

At a second step, the task 208 is invoked and is provided access to event data that is to be included in the acknowledgement 203. The task 208 may update the event data. The task 208 sends a notification to the receiver component 202 upon completion of the task 208.

At a third step, the task 216 is invoked. Since the task 216 has not been annotated as a listener component, the task 216 is not provided access to the event data. The receiver component 202 is not configured to wait for completion of the task 216 before sending the acknowledgement 203.

Similar to the second step, at a fourth step, the task 210 is invoked and is provided access to event data that is to be included in the acknowledgement 203. The task 210 may update the event data. The task 210 sends a notification to the receiver component 202 upon completion of the task 210.

The receiver component 202 is configured to detect that completion notifications have been received from all registered listeners (e.g., both the task 208 and the task 210). The receiver component 202 generates the acknowledgment 203, using event data that may been modified by the task 208 and/or the task 210, and sends the acknowledgement 203 to the sender component 205. In some implementations, the receiver component 202 validates the acknowledgement 203 before sending the acknowledgement 203. Validation can include determining whether the data in the acknowledgement 203, including data enhanced by the task 208 and/or the task 210, is in a proper format.

For some process models, the receiver component 202 may not be associated with any listeners. If a receiver component does not have any registered listeners, the receiver component can send a default acknowledgement to the sending component, without waiting for downstream tasks to complete.

Although event data enhancement can be performed by one or more listener tasks, in some implementations, each listener task sends a completion notification to the receiving component 202 but does not enhance the received event data. The receiving component 202 still waits to receive completion notifications from each downstream listener task before sending the acknowledgement 203. In this example, the acknowledgement 203 may be an indication that the receiver component 202 and each registered listener task have completed, rather than an acknowledgement that includes specific information generated by downstream task (s).

Figure 3:
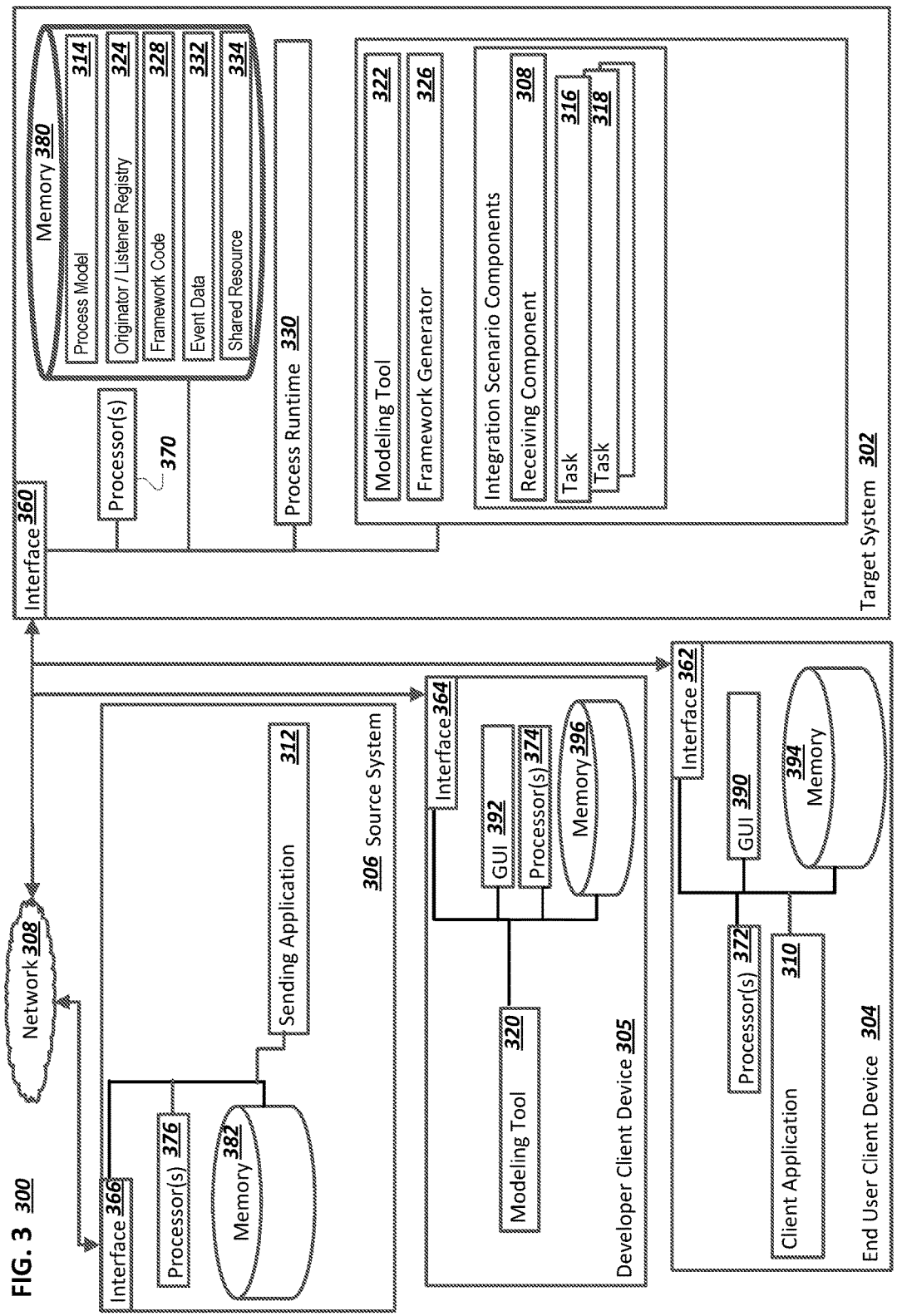
FIG. 3 is a block diagram illustrating an example system for enabling synchronous editable signals in process modeling.

FIG. 3 is a block diagram illustrating an example system 300 for enabling synchronous editable signals in process modeling. Specifically, the illustrated system 300 includes or is communicably coupled with a target system 302, a client device 304 (e.g., an end-user client device), a developer client device 305, a source system 306, and a network 308. Although shown separately, in some implementations, functionality of two or more systems or servers may be provided by a single system or server. In some implementations, the functionality of one illustrated system or server may be provided by multiple systems or servers.

The target system 302 includes a receiving component 308 that is configured to receive a message from an external system (e.g., a message from a client application 310 running on the client device 304 or a message from a sending application 312 on the source system 306). A process model 314 describes an integration scenario between the target system 302 and the external system. The process model 314 can describe that the receiving component 308 initiates one or more tasks (e.g., a task 316 and a task 318) in response to receiving a message from the external system.

A task is a component that can perform an operation on a message received by the task. For example, a task can convert a received message that is in a first format to a transformed message that is in a second format. As another example, a task can split an incoming message into multiple sub-messages. A task can receive a message from the receiving component 308.

A developer can use a modeling tool 320 (which may be a client version of a server modeling tool 322) running on the developer client device 305 to edit a visual representation of the process model 314. The developer can, for example, annotate a representation of the receiving component 308 to indicate that the receiving component 308 is an originator component that is to wait for configured listener components to complete before sending an acknowledgement to the external system. The developer can annotate representations of one or more of the tasks 316 and 318 as listener components. A subset of tasks can be annotated as listener components. For example, the task 318, but not the task 316, can be annotated as a listener component.

In response to annotations, an originator/listener registry 324 can be updated to store mappings of listener(s) to an originator. The originator/listener registry 324 can be for a particular process model 314 or can store mappings for multiple process models. In some implementations, the originator/listener registry is stored as part of the process model 314 (e.g., the process model 314 can be stored as an XML (eXtensible Markup Language) file and the originator/listener mappings 324 can be stored as originator XML elements that are linked to corresponding listener XML elements).

A framework generator 326 can generate framework code 328 that, when executed by a process runtime 330, causes the receiving component 308 to provide event data 332 or a reference to a shared resource 334 to the task 318 when the task 318 is invoked (e.g., due to the task 318 being designated, in the originator/listener registry 324, as a listener of the receiving component 308). The task 318 can modify the event data 332 or the shared resource 334 to provide enhanced acknowledgment information to be later sent to the external system.

Execution of the framework code 328 can cause the receiving component 308 to wait until all registered listeners have completed before the receiving component 308 sends an acknowledgement to the external system. The receiving component 308 can include information in the event data 332 or the shared resource 334 when generating the acknowledgement.

As used in the present disclosure, the term "computer" is intended to encompass any suitable processing device. For example, although FIG. 3 illustrates a single target system 302, a single client device 304, a single developer client device 305, and a single application server 306, the system 300 can be implemented using a single, stand-alone computing device, two or more target systems 302, two or more source systems 306, two or more client devices 304, two or more developer client devices 305, etc. Indeed, the target system 302, the source system 306, the developer client device 305, and the client device 304 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the target system 302, the source system 306, the developer client device 305, and the client device 304 may be adapted to execute any operating system, including Linux, UNIX, Windows, Mac OS®, Java™, Android™, iOS or any other suitable operating system. According to one implementation, the application server 306 and/or the target system 302 may also include or be communicably coupled with an e-mail server, a Web server, a caching server, a streaming data server, and/or other suitable server.

Interfaces 360, 362, 364, and 366 are used by the target system 302, the client device 304, the developer client device 305, and the source system 306, respectively, for communicating with other systems in a distributed environment—including within the system 300—connected to the network 308. Generally, the interfaces 360, 362, 364, and 366 each comprise logic encoded in software and/or hardware in a suitable combination and operable to communicate with the network 308. More specifically, the interfaces 360, 362, 364, and 366 may each comprise software supporting one or more communication protocols associated with communications such that the network 308 or interface's hardware is operable to communicate physical signals within and outside of the illustrated system 300.

The target system 302, the client device 304, the developer client device 305, and the source system 306, each respectively include one or more processors 370, 372, 374, or 376. Each processor in the processors 370, 372, 374, and 376 may be a central processing unit (CPU), a blade, an application specific integrated circuit (ASIC), a field-programmable gate array (FPGA), or another suitable component. Generally, each processor in the processors 370, 372, 374, and 376 executes instructions and manipulates data to perform the operations of a respective computing device.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 3 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The target system 302 and the source system 306 respectively include memory 380 or memory 382. In some implementations, the target system 302 and/or the application server 306 include multiple memories. The memory 380 and the memory 382 may each include any type of memory or database module and may take the form of volatile and/or non-volatile memory including, without limitation, magnetic media, optical media, random access memory (RAM), read-only memory (ROM), removable media, or any other suitable local or remote memory component. Each of the memory 380 and the memory 382 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the respective computing device.

The client device 304 and the developer client device 305 may each be any computing device operable to connect to or communicate in the network 308 using a wireline or wireless connection. In general, each of the client device 304 and the developer client device 305 comprises an electronic computer device operable to receive, transmit, process, and store any appropriate data associated with the system 300 of FIG. 3. Each of the client device 304 and the developer client device 305 can include one or more client applications, including the client application 310 or the modeling tool 320, respectively. A client application is any type of application that allows a client device to request and view content on the client device. In some implementations, a client application can use parameters, metadata, and other information received at launch to access a particular set of data from the target system 302. In some instances, a client application may be an agent or client-side version of the one or more enterprise applications running on an enterprise server (not shown).

Each of the client device 304 and the developer client device 305 is generally intended to encompass any client computing device such as a laptop/notebook computer, wireless data port, smart phone, personal data assistant (PDA), tablet computing device, one or more processors within these devices, or any other suitable processing device. For example, the client device 304 and/or the developer client device 305 may comprise a computer that includes an input device, such as a keypad, touch screen, or other device that can accept user information, and an output device that conveys information associated with the operation of the target system 302, or the client device itself, including digital data, visual information, or a graphical user interface (GUI) 390 or 392, respectively.

The GUI 390 and the GUI 392 each interface with at least a portion of the system 300 for any suitable purpose, including generating a visual representation of the client application 310 or the modeling tool 320, respectively. In particular, the GUI 390 and the GUI 392 may each be used to view and navigate various Web pages. Generally, the GUI 390 and the GUI 392 each provide the user with an efficient and user-friendly presentation of business data provided by or communicated within the system. The GUI 390 and the GUI 392 may each comprise a plurality of customizable frames or views having interactive fields, pull-down lists, and buttons operated by the user. The GUI 390 and the GUI 392 each contemplate any suitable graphical user interface, such as a combination of a generic web browser, intelligent engine, and command line interface (CLI) that processes information and efficiently presents the results to the user visually.

Memory 394 and memory 396 respectively included in the client device 304 or the developer client device 305 may each include any memory or database module and may take the form of volatile or non-volatile memory including, without limitation, magnetic media, optical media, random access memory (RAM), read-only memory (ROM), removable media, or any other suitable local or remote memory component. The memory 394 and the memory 396 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 304.

There may be any number of client devices 304 and developer client devices 305 associated with, or external to, the system 300. Additionally, there may also be one or more additional client devices external to the illustrated portion of system 300 that are capable of interacting with the system 300 via the network 308. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Figure 4:
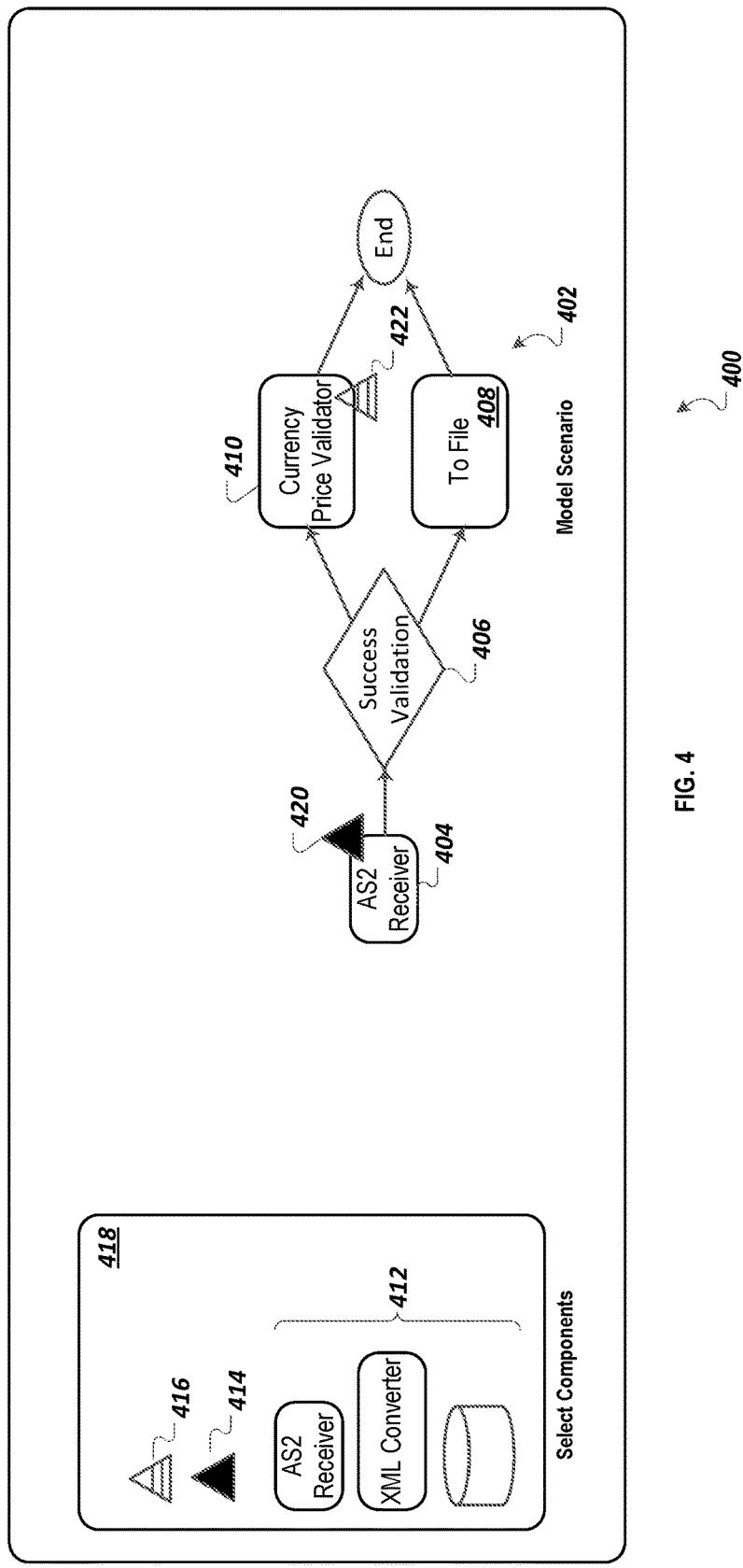
FIG. 4 is a user interface of a modeling editor.

FIG. 4 is a user interface of a modeling editor 400. The modeling editor 400 displays a process model 402 that is being edited. The process model 402 includes a receiver component 404 (e.g., an AS2 receiver) that receives an event from an external system. A validation task 406 performs a validation test. A to file task 408 writes data to a file. A currency price validator task 410 validates a currency price included in the message.

A developer can create the process model 402 by selecting model elements, including process elements 412, an origin signal designator 414, and a listener signal designator 416, from an element palette 418. An originator signal designator 414 can be associated with (e.g., dragged onto) a component in the process model 402 to designate the component as an originator. For example, an originator designator 420 annotating the receiver component 404 designates the receiver component 404 as an originator. The originator signal designator 420 represents an origin signal that is sent by the receiver component 404 to listener components that are mapped to the receiver component 404. When the originator signal designator 420 is associated with the receiver component 404 (e.g., via a drag-and-drop operation, a context-sensitive menu selection, etc.), the developer (or the modeling editor 400) can provide a unique identifier that identifies the origin signal.

A listener signal designator 416 can be associated with (e.g., dragged onto) a component in the process model 402, to designate the component as a listener. For example, a listener signal designator 422 annotating the currency price validator task 410 designates the currency price validator task 410 as a listener. When the listener signal designator 422 is associated with the currency price validator task 410, the developer can provide or select the same unique identifier that identifies the origin signal, to bind the currency price validator task 410, as a listener, to the receiver component 404 originator.

Certain kinds of components can be eligible to be originators or listeners. The modeling editor 400 can allow the originator designator 414 to be associated with (e.g., dragged onto) a component that is eligible to be an originator and can disallow (e.g., prevent) the originator designator 414 from being associated with a component that is not eligible to be an originator. Likewise, the modeling editor 400 can allow the listener designator 416 to be associated with a component that is eligible to be a listener and can prevent the listener designator 416 from being associated with a component that is not eligible to be a listener. A component can be eligible to be an originator, for example, if the component is configured to generate an event. As another example, a component can be eligible to be an originator if the component implements an originator software interface, as described below. Similarly, a component can be eligible to be a listener if the component is configured to receive an event and/or if the component implements a listener software interface.

The model 402 can be saved as model code (e.g., XML code). The model 402 can be deployed (e.g., published), for execution by an integration engine. Upon saving and publishing of the model 402, framework code can be generated that causes a runtime version of the receiver component 404 to provide access to event data to the currency price validator task 410, to wait until the currency price validator task 410 has completed, and generate an acknowledgement to be sent to a sending system that includes event data updated by the currency price validator task 410.

Figures 5A, 5B:
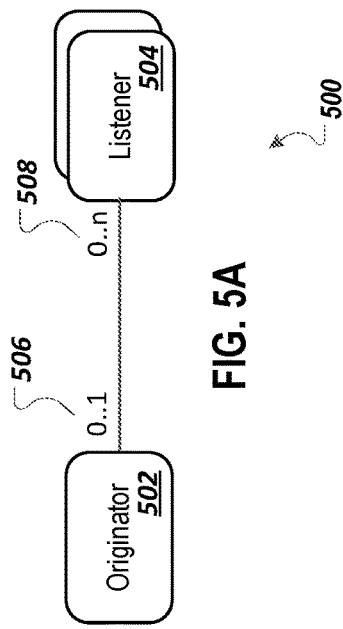
FIG. 5A is a relationship model that illustrates potential number of occurrence(s) of an originator component and listener components in an integration scenario.
FIG. 5B is example code that maps an originator component to a set of listener components.

FIG. 5A is a relationship model 500 that illustrates potential number of occurrence(s) of an originator component 502 and listener components 504 in an integration scenario. As illustrated by a cardinality 506 of 0 . . . 1, an integration scenario may or may not include an originator component. As illustrated by a cardinality 508 of 0 . . . n, an integration scenario may include zero or more listener components, with each listener component 504 being associated with the originator component 502 (if the integration scenario includes the originator component 502).

FIG. 5B is example code 550 that maps an originator component to a set of listener components. The code 550 includes a receiver component element 552 and task component elements 554, 556, and 558. The receiver component element 552 includes a property attribute 560 that indicates that the receiver component represented by the receiver component element 552 is an originator (e.g., attribute value 562) with an originator identifier of "123" (e.g., attribute value 564).

The task component element 554 includes a property attribute 566 that indicates that the task component represented by the task component element 554 is a listener (e.g., attribute value 568) that is linked to the receiver/originator component represented by the receiver component element

552 (e.g., due to an attribute value 570 of "originId=123" matching the attribute value 564). Similarly, the task component element 556 includes a property attribute 572, with attribute values 574 and 576 that indicates that the task component represented by the task component element 556 is a listener that is linked to the receiver/originator component represented by the receiver component element 552.

Figure 6:
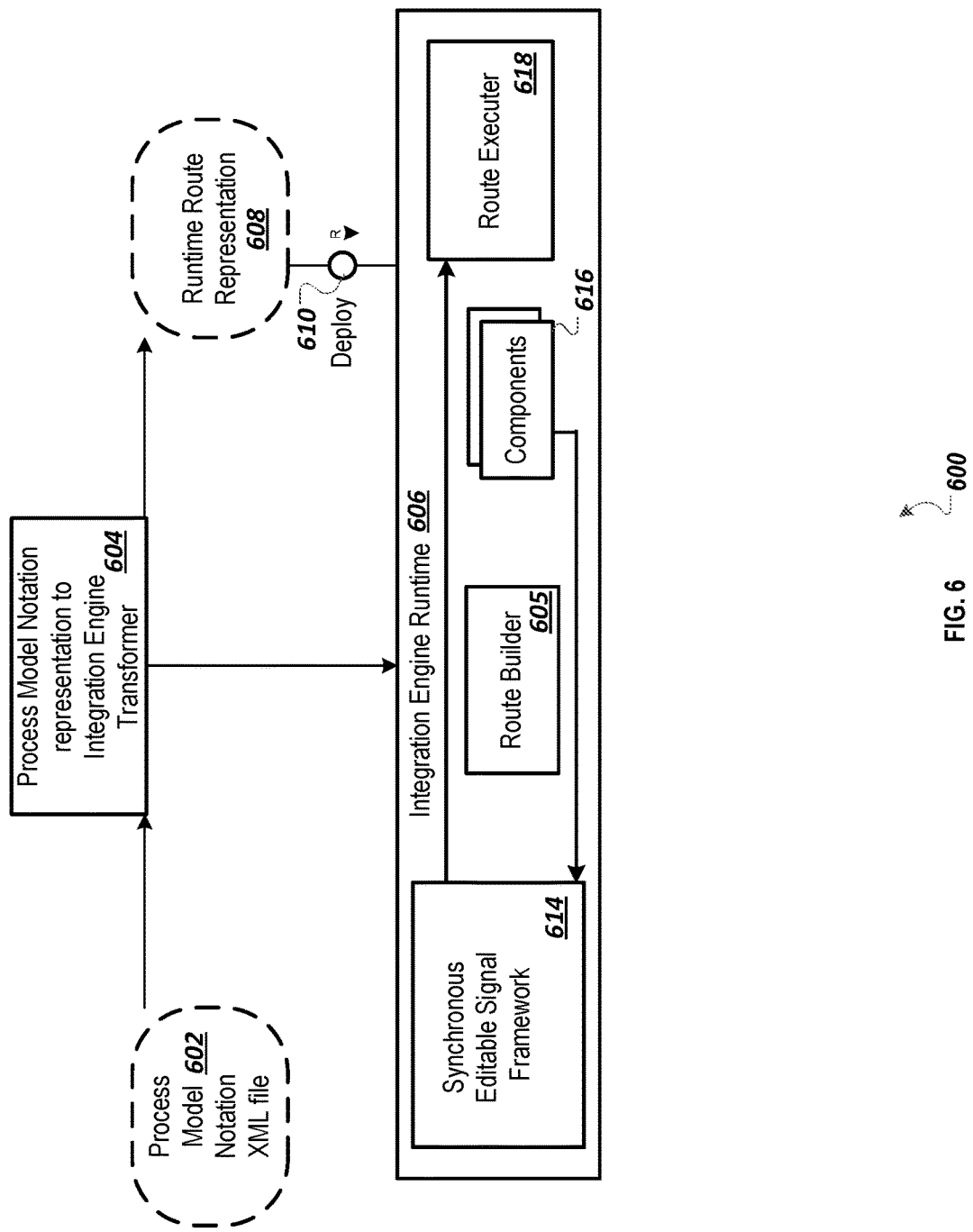
FIG. 6 illustrates an example system for run-time execution of integration scenarios.

FIG. 6 illustrates an example system 600 for run-time execution of integration scenarios. A process model notation XML file 602 can be provided as an input to a transformer component 604. The process model notation XML file 602 can include code portions such as the code 550 described above with respect to FIG. 5B. The transformer component 604 can use a route builder 605 in an integration engine runtime 606 to transform the process model notation XML file 602 to a runtime route representation 608. The runtime route representation 608 is a sequence of commands, that, when executed, can implement the process described in the process model notation XML file 602. The runtime route representation 608 can be deployed to the integration engine runtime 606 (e.g., as illustrated by a deploy request 610).

A synchronous editable signal framework 614 can be included in (e.g., added to) the integration engine runtime 606 to handle synchronous editable events. The synchronous editable signal framework 614 can instantiate an originator or listener instance in a components repository 616 for each respective originator or listener component that is identified by the transformer component 604 in the process model notation XML file 602.

The runtime route representation 608 can be executed by a route executer 618. The route executor 618 can use the synchronous editable signal framework 614 to implement originator and listener functionality of originator and listener components included in the components 616. The synchronous editable signal framework 614 can generate an event when a message is received by an originator component (e.g., from an external system) and provide the event to each listener associated with the originator. Each respective listener can enhance the event and can send a notification (e.g., to the synchronous editable signal framework 614 and/or to the associated originator) when the respective listener's processing has completed. The synchronous editable signal framework 614 and/or the originator can track how many listeners have received the event and how many listeners have completed. The synchronous editable signal framework 614 and/or the originator can determine when all registered listeners have completed. When all registered listeners have been completed, the originator can construct an acknowledgment, using the listener-enhanced event information, and send/dispatch the acknowledgement to the external system.

The originator and/or the synchronous editable signal framework 614 can be configured to handle a situation in which not all registered listeners signal their completion. For example, a timer having a particular configured time interval can be started when the event is sent to the registered listeners, and a timeout situation can be detected if the time interval has elapsed before all registered listeners have completed. The originator and/or the synchronous editable signal framework 614 can be configured to generate an error condition, send a status request to uncompleted listeners and wait an additional time interval before generating an error condition, or generate and send the acknowledgement to the external system using whatever enhanced event information (if any) has been received from completed listeners.

Figure 7:
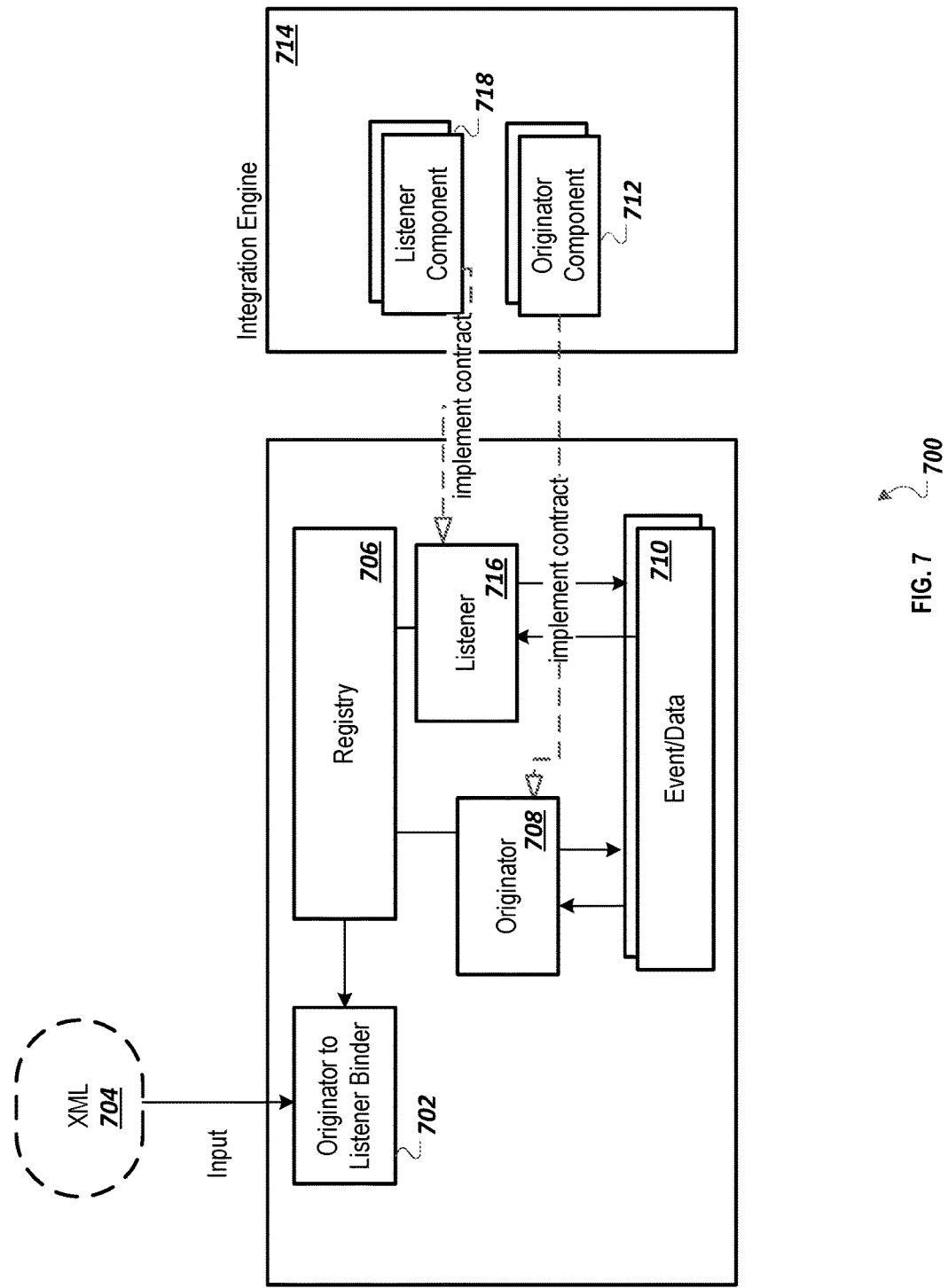
FIG. 7 illustrates an example system for handling originator and listener components.

FIG. 7 illustrates an example system 700 for handling originator and listener components. An originator to listener binder 702 can parse a process model notation XML file 704 to identify mappings between originators and listeners that exist in the process model notation XML file 704. The originator and listener binder 702 can be used as a utility component by a registry component 706 to register originator and listener instances at a deployment time for a process model. For example, the registry component 706 can include, after deployment, runtime instances of originators and corresponding listeners. The registry component can use a map data structure to map an originator instance to corresponding listener instances. For example, the map data structure can be represented in source code as: Map<OriginatorID, List<Listeners>>.

An originator interface 708 can be defined that represents and implements base functionality for all originator instances. The originator interface 708 can include method declarations for receiving a message from a sending component, creation of event data 710, waiting for listener completion, and sending final event data to the sending component after completion of all registered listeners. Originator instances 712 running in an integration engine 714 can be runtime objects that have implemented the originator interface 708.

A listener interface 716 can be defined that represents and implements base functionality for all listener instances. The listener interface 716 can include method declarations for receiving event data 710 from the originator, processing/enhancing the event data 710, and signaling completion. Listener instances 718 running in the integration engine 714 can be runtime objects that have implemented the listener interface 716.

A process model developer can create classes that implement the originator interface 708 or the listener interface 716, respectively, according to requirements of a particular process, to create design time originator or listener components. Once a developer has created originator and listener classes, the developer can, at design time, bind listener(s) to an originator, such as by using a model editor, as described above. The synchronous editable signal framework 614 described above can create and integrate instances of the developer-provided classes, at runtime, into runtime execution of the process model.

Figure 8:
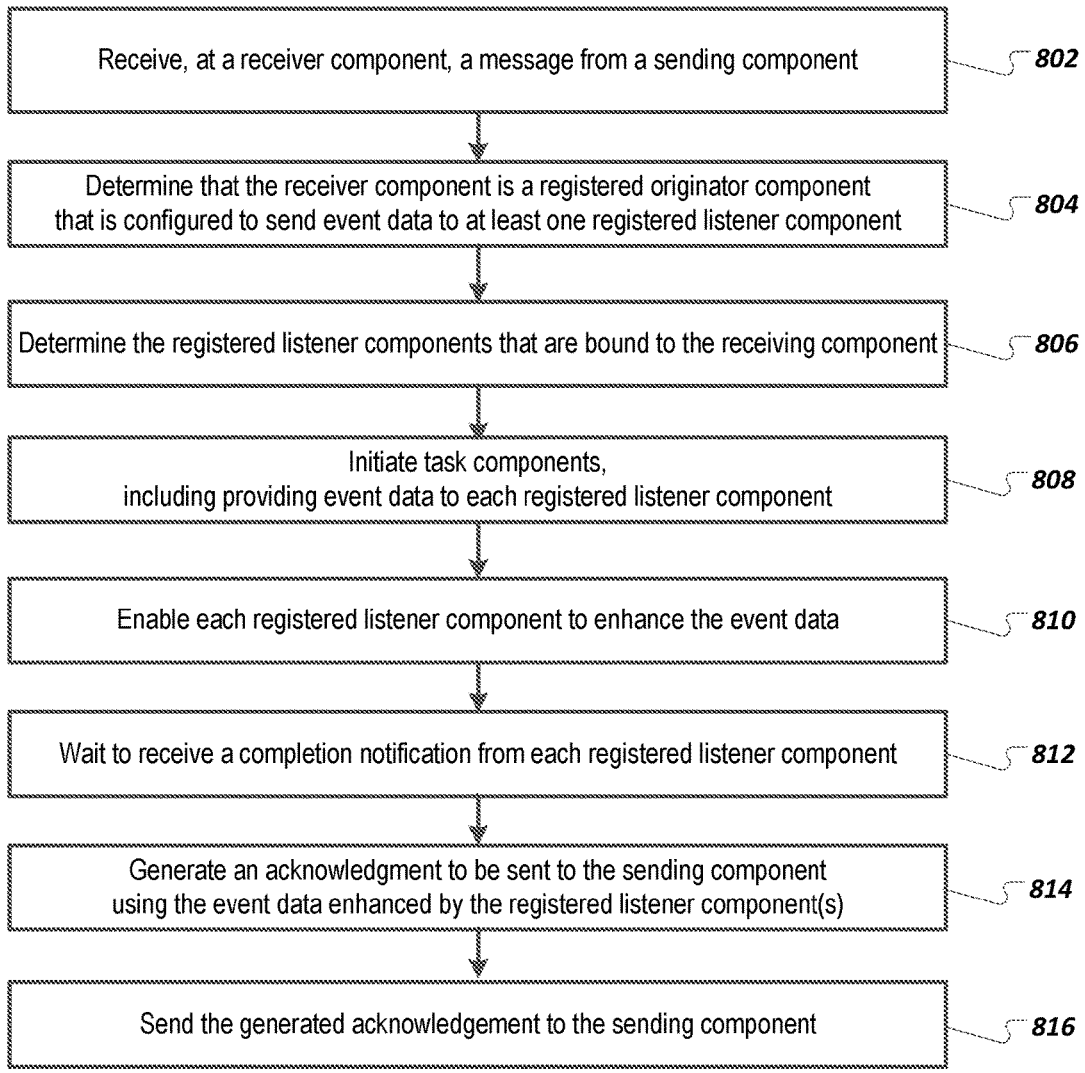
FIG. 8 is a flowchart of an example method for enabling synchronous editable signals in process modeling.

FIG. 8 is a flowchart of an example method for enabling synchronous editable signals in process modeling. It will be understood that method 800 and related methods may be performed, for example, by any suitable system, environment, software, and hardware, or a combination of systems, environments, software, and hardware, as appropriate. For example, one or more of a client, a server, or other computing device can be used to execute method 800 and related methods and obtain any data from the memory of a client, the server, or the other computing device. In some implementations, the method 800 and related methods are executed by one or more components of the system 300 described above with respect to FIG. 3. For example, the method 800 and related methods can be executed by the process runtime 330 of FIG. 3.

At 802, a message is received, at a receiver component, from a sending component of an external system as part of execution of an integration scenario with the external system. The integration scenario is defined by a process model that defines the receiver component and at least one task component. Each task component is configured to perform processing for the integration scenario.

At 804, a determination is made that the receiver component is a registered originator component that is configured to send event data to at least one registered listener component that has been bound to the receiver component. Each registered listener component is a task component defined by the process model. The receiver component can be bound to the listener component(s) in a registry.

At 806, the registered listener components that are bound to the receiving component are determined. For example, the registry can be queried to determine which listener components are bound to the receiver component.

At 808, each task component is executed as part of executing the integration scenario. Each registered listener component is provided, upon execution with event data sent by the receiver component. The event data can be an event object, event data that is associated with an event object, a reference to event data, a reference to the event object, a shared resource that is accessible to the listener components, or a reference to a shared resource.

At 810, each registered listener component is enabled to enhance the event data received by each respective registered listener component. Each listener object can enhance the event data with information specific to the processing performed by the listener component. The specific information can be used by the receiver component when sending an acknowledgement to the sender component.

At 812, the receiver component waits to receive a completion notification from each registered listener component. The receiver component (or a framework that executes the receiver and listener components) can know the total number of listeners that are bound to the receiver component, can be configured to receive completion notifications from listener components, and can determine when a completion notification has been received from each listener component that is bound to the receiver component.

At 814, an acknowledgement to be sent to the sending component is generated (e.g., by the receiver component) using the event data enhanced by the at least one registered listener component. The receiver component can validate the enhanced event data before generating the acknowledgement.

At 816, the generated acknowledgment, including the enhanced event data, is sent to the sending component.

The preceding figures and accompanying description illustrate example processes and computer-implementable techniques. But system 300 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 300 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving, at a receiver component, a message from a sending component of an external system as part of execution of an integration scenario with the external system, the integration scenario defined by a process model that defines the receiver component and at least one task component, with each task component configured to perform processing for the integration scenario;
determining, by the receiver component, that the receiver component is a registered originator component that is configured to send event data to at least one registered listener component that has been bound to the receiver component, with each registered listener component being a task component defined by the process model;
determining which of the task components are registered listener components that are bound to the receiving component;
executing each task component, including providing each registered listener component with the event data;
enabling each registered listener component to enhance the event data received by each respective registered listener component;
waiting, by the receiver component and before sending an acknowledgment to the sending component, to receive a completion notification from each registered listener component;
in response to receiving a completion notification from each registered listener component, generating, by the receiver component, the acknowledgement to be sent to the sending component using the event data enhanced by the at least one registered listener component; and
sending, by the receiver component, the generated acknowledgment to the sending component.

2. The method of claim 1, wherein the receiver component is designated, at design time, as a registered originator component.

3. The method of claim 2, wherein the receiver component is designated as a registered originator component using an originator annotation available in a process modeling editor.

4. The method of claim 3, wherein each registered listener component is designated, at design time, as bound to the originator component.

5. The method of claim 4, wherein a registered listener component is annotated as a listener component using a listener annotation available in the process modeling editor.

6. The method of claim 1, wherein the event data is a shared resource that is accessible by the receiver component and each registered listener component.

7. The method of claim 1, wherein the receiver component and the registered listener components are processed by a framework added to an integration engine.

8. The method of claim 1, wherein the receiver component implements an originator interface provided by the framework.

9. The method of claim 1, wherein each registered listener component implements a listener interface provided by the framework.

10. A system comprising:
one or more computers; and
a computer-readable medium coupled to the one or more computers having instructions stored thereon which, when executed by the one or more computers, cause the one or more computers to perform operations comprising:
receiving, at a receiver component, a message from a sending component of an external system as part of execution of an integration scenario with the external system, the integration scenario defined by a process model that defines the receiver component and at least one task component, with each task component configured to perform processing for the integration scenario;

determining, by the receiver component, that the receiver component is a registered originator component that is configured to send event data to at least one registered listener component that has been bound to the receiver component, with each registered listener component being a task component defined by the process model;

determining which of the task components are registered listener components that are bound to the receiving component;

executing each task component, including providing each registered listener component with the event data;

enabling each registered listener component to enhance the event data received by each respective registered listener component;

waiting, by the receiver component and before sending an acknowledgment to the sending component, to receive a completion notification from each registered listener component;

in response to receiving a completion notification from each registered listener component, generating, by the receiver component, the acknowledgement to be sent to the sending component using the event data enhanced by the at least one registered listener component; and sending, by the receiver component, the generated acknowledgment to the sending component.

11. The system of claim 10, wherein the receiver component is designated, at design time, as a registered originator component.

12. The system of claim 11, wherein the receiver component is designated as a registered originator component using an originator annotation available in a process modeling editor.

13. The system of claim 12, wherein each registered listener component is designated, at design time, as bound to the originator component.

14. The system of claim 13, wherein a registered listener component is annotated as a listener component using a listener annotation available in the process modeling editor.

15. The system of claim 10, wherein the event data is a shared resource that is accessible by the receiver component and each registered listener component.

16. A computer program product encoded on a non-transitory storage medium, the product comprising non-transitory, computer readable instructions for causing one or more processors to perform operations comprising:

receiving, at a receiver component, a message from a sending component of an external system as part of execution of an integration scenario with the external system, the integration scenario defined by a process model that defines the receiver component and at least one task component, with each task component configured to perform processing for the integration scenario;

determining, by the receiver component, that the receiver component is a registered originator component that is configured to send event data to at least one registered listener component that has been bound to the receiver component, with each registered listener component being a task component defined by the process model;

determining which of the task components are registered listener components that are bound to the receiving component;

executing each task component, including providing each registered listener component with the event data;

enabling each registered listener component to enhance the event data received by each respective registered listener component;

waiting, by the receiver component and before sending an acknowledgment to the sending component, to receive a completion notification from each registered listener component;

in response to receiving a completion notification from each registered listener component, generating, by the receiver component, the acknowledgement to be sent to the sending component using the event data enhanced by the at least one registered listener component; and sending, by the receiver component, the generated acknowledgment to the sending component.

17. The computer program product of claim 16, wherein the receiver component is designated, at design time, as a registered originator component.

18. The computer program product of claim 17, wherein the receiver component is designated as a registered originator component using an originator annotation available in a process modeling editor.

19. The computer program product of claim 18, wherein each registered listener component is designated, at design time, as bound to the originator component.

20. The computer program product of claim 19, wherein a registered listener component is annotated as a listener component using a listener annotation available in the process modeling editor.

* * * * *